US008503432B2

(12) United States Patent
Kahn et al.

(10) Patent No.: US 8,503,432 B2
(45) Date of Patent: Aug. 6, 2013

(54) METHOD AND APPARATUS FOR SIGNALING PROPRIETARY INFORMATION BETWEEN NETWORK ELEMENTS OF A CORE NETWORK IN A WIRELESS COMMUNICATION NETWORK

(75) Inventors: Colin Kahn, Morris Plains, NJ (US); Philip Lamoureux, Succasunna, NJ (US)

(73) Assignee: Alcatel Lucent, Paris (FR)

( * ) Notice: Subject to any disclaimer, the term of this patent is extended or adjusted under 35 U.S.C. 154(b) by 377 days.

(21) Appl. No.: 12/241,244

(22) Filed: Sep. 30, 2008

(65) Prior Publication Data
US 2010/0080123 A1 Apr. 1, 2010

(51) Int. Cl.
*H04L 12/66* (2006.01)
*H04L 12/28* (2006.01)

(52) U.S. Cl.
USPC .................. 370/352; 370/389; 370/392

(58) Field of Classification Search
USPC ................................. 370/389–392
See application file for complete search history.

(56) References Cited

U.S. PATENT DOCUMENTS

| 6,538,989 | B1 | 3/2003 | Carter et al. | |
|---|---|---|---|---|
| 6,631,122 | B1 | 10/2003 | Arunachalam | |
| 6,788,646 | B1 | 9/2004 | Fodor et al. | |
| 7,760,646 | B2 | 7/2010 | Kekki | |
| 2003/0039246 | A1* | 2/2003 | Guo et al. | 370/389 |

(Continued)

FOREIGN PATENT DOCUMENTS

| DE | 10 2005 035 237 A1 | 3/2007 |
|---|---|---|
| EP | 1 304 831 A2 | 4/2003 |
| JP | 2001-320410 A | 11/2001 |

OTHER PUBLICATIONS

K. Ramakrishnan et al., "The Addition of Explicit Congestion Notification (ECN) to IP," RFC 3168, Standards Track, Sep. 2001, http://www.ietf.org/rfc/rfc3168.txt.

(Continued)

*Primary Examiner* — Brandon Renner
(74) *Attorney, Agent, or Firm* — Wall & Tong, LLP

(57) ABSTRACT

The invention includes a method and apparatus for signaling proprietary information between network elements of a core network (CN) of a wireless communication network. A method for signaling proprietary information within the CN includes encoding the proprietary information in an IPv4 Options field of an inner header of an IP packet, and prepending an outer header to the IP packet for Mobile IPv4 (MIPv4) tunneling the IP packet from a first node of the CN to a second node of the CN. The first and second nodes of the CN may include a mobility anchor node and a mobility gateway node, respectively. The first and second nodes of the CN may include a mobility gateway node and a mobility anchor node, respectively. A method for signaling proprietary information includes receiving a tunneled IP packet at a first node of the CN (where the IP packet includes an outer header, an inner header, and a payload), removing the outer header from the IP packet, stripping an IP Options field from the inner header of the IP packet where the IPv4 Options field includes the proprietary information, and propagating the proprietary information from the first node of the CN to a second node. The first node of the CN may be a mobility gateway node and the second node may be a node of a radio access network (RAN). The first node of the CN may be a mobility anchor node and the second node may be another node of the CN.

56 Claims, 4 Drawing Sheets

U.S. PATENT DOCUMENTS

| | | | |
|---|---|---|---|
| 2003/0235171 A1* | 12/2003 | Lundstrom et al. | 370/338 |
| 2004/0111541 A1 | 6/2004 | Meyer et al. | |
| 2004/0141462 A1* | 7/2004 | Mistry et al. | 370/229 |
| 2004/0148425 A1* | 7/2004 | Haumont et al. | 709/236 |
| 2004/0218617 A1 | 11/2004 | Sagfors | |
| 2005/0094618 A1 | 5/2005 | Colban et al. | |
| 2005/0111462 A1 | 5/2005 | Walton et al. | |
| 2005/0237969 A1* | 10/2005 | Jung et al. | 370/328 |
| 2005/0249114 A1 | 11/2005 | Mangin et al. | |
| 2005/0265363 A1* | 12/2005 | Chen | 370/401 |
| 2006/0007862 A1 | 1/2006 | Sayeedi et al. | |
| 2006/0098645 A1* | 5/2006 | Walkin | 370/389 |
| 2006/0126509 A1 | 6/2006 | Abi-Nassif et al. | |
| 2006/0182065 A1 | 8/2006 | Petrovic et al. | |
| 2006/0239188 A1 | 10/2006 | Weiss et al. | |
| 2006/0268689 A1 | 11/2006 | Tarraf et al. | |
| 2006/0268908 A1 | 11/2006 | Wang et al. | |
| 2007/0153695 A1 | 7/2007 | Gholmieh et al. | |
| 2007/0195788 A1 | 8/2007 | Vasamsetti | |
| 2007/0207818 A1* | 9/2007 | Rosenberg et al. | 455/461 |
| 2008/0005572 A1* | 1/2008 | Moskowitz | 713/176 |
| 2008/0089237 A1 | 4/2008 | Molen et al. | |
| 2008/0137536 A1* | 6/2008 | Hede | 370/236 |
| 2008/0192711 A1* | 8/2008 | Balachandran et al. | 370/338 |
| 2009/0083144 A1* | 3/2009 | Menditto et al. | 705/14 |
| 2009/0225655 A1 | 9/2009 | Ray et al. | |
| 2009/0252148 A1 | 10/2009 | Dolganow et al. | |
| 2009/0285099 A1 | 11/2009 | Kahn et al. | |
| 2009/0296613 A1 | 12/2009 | Kahn et al. | |
| 2009/0300153 A1 | 12/2009 | Ray et al. | |
| 2010/0080153 A1 | 4/2010 | Kahn et al. | |

OTHER PUBLICATIONS

F. Chang and J. Ren, "Validating System Properties Exhibited in Execution Traces," ASE'07, Nov. 4-9, 2007, Atlanta, Georgia.

International Search Report and The Written Opinion of the International Searching Authority, or the Declaration, in PCT/US2009/003269, Alcatel-Lucent USA Inc., Applicant, dated Nov. 2, 2009, 12 pages.

Office Action in EP Application No. 09 758 703.4-1249, Alcatel-Lucent USA Inc., Applicant, mailed Oct. 13, 2011, 7 pages.

R. Gibbens, P. Key, "Distributed Control and Resource Marking Using Best-Effort Routers," IEEE Network, IEEE Service Center, New York, NY, US, vol. 15, No. 3, May 1, 2001, pp. 54-59.

Jul. 24, 2012 Office Action in Japanese Patent Application No. 2011-512458, Alcatel-Lucent USA Inc., Applicant, 3 pages.

* cited by examiner

METHOD AND APPARATUS FOR SIGNALING PROPRIETARY INFORMATION BETWEEN NETWORK ELEMENTS OF A CORE NETWORK IN A WIRELESS COMMUNICATION NETWORK

FIELD OF THE INVENTION

The invention relates to the field of communication networks and, more specifically, to propagating information within a core network serving a radio access network (RAN) in a wireless communication network.

BACKGROUND OF THE INVENTION

In existing Third Generation (3G) and Fourth Generation (4G) wireless communication networks, the signaling between network elements of the core network (CN) and network elements of the Radio Access Network (RAN) is highly standardized. Disadvantageously, such existing signaling capabilities limit the ability of service providers to communicate information within the CN and between the CN and the RAN.

SUMMARY OF THE INVENTION

Various deficiencies in the prior art are addressed through a method and apparatus for signaling proprietary information between network elements of a core network (CN) of a wireless communication network.

In one embodiment, a method for signaling proprietary information within a core network (CN) of a wireless communication network includes encoding the proprietary information in an IPv4 Options field of an inner header of an IP packet, and pre-pending an outer header to the IP packet for Mobile IPv4 (MIPv4) tunneling the IP packet from a mobility anchor node of the CN toward a mobility gateway node of the CN.

In one embodiment, a method for signaling proprietary information within a wireless communication network having a core network (CN) and a radio access network (RAN) includes receiving an IP packet (including an outer header, an inner header, and a payload) at a mobility gateway node operating as a gateway from the CN to the RAN, removing the outer header from the IP packet, stripping an IPv4 Options field from the inner header of the IP packet where the IPv4 Options field includes the proprietary information, and propagating the proprietary information from the mobility gateway node of the CN toward a control node of the RAN.

In one embodiment, a method for signaling proprietary information within a core network (CN) of a wireless communication network includes encoding the proprietary information in an IPv4 Options field of an inner header of an IP packet, and pre-pending an outer header to the IP packet for Mobile IPv4 (MIPv4) tunneling of the IP packet from a mobility gateway node of the CN toward a mobility anchor node of the CN.

In one embodiment, a method for signaling proprietary information within a wireless communication network having a core network (CN) and a radio access network (RAN) includes receiving an IP packet (including an outer header, an inner header, and a payload) at a mobility anchor node of the CN, removing the outer header from the IP packet, stripping an IPv4 Options field from the inner header of the IP packet where the IPv4 Options field includes the proprietary information, and performing at least one of performing a control function within the CN using the proprietary information and propagating the proprietary information toward at least one other node of the CN.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The proprietary information signaling functions depicted and described herein enable proprietary information to be conveyed between nodes of a core network (CN) that is serving a radio access network (RAN) in a wireless communication network. The proprietary information signaling functions depicted and described herein enable proprietary information to be conveyed from the CN to the RAN for use by the RAN in performing control functions within the RAN. The proprietary information signaling functions depicted and described herein enable proprietary information to be conveyed from the RAN to the CN for use by the CN in performing control functions within the CN. The proprietary information signaling functions are provided on a per-packet basis, thereby providing a per-packet, and, thus, per-flow, signaling channel between the CN and RAN.

Figure 1:
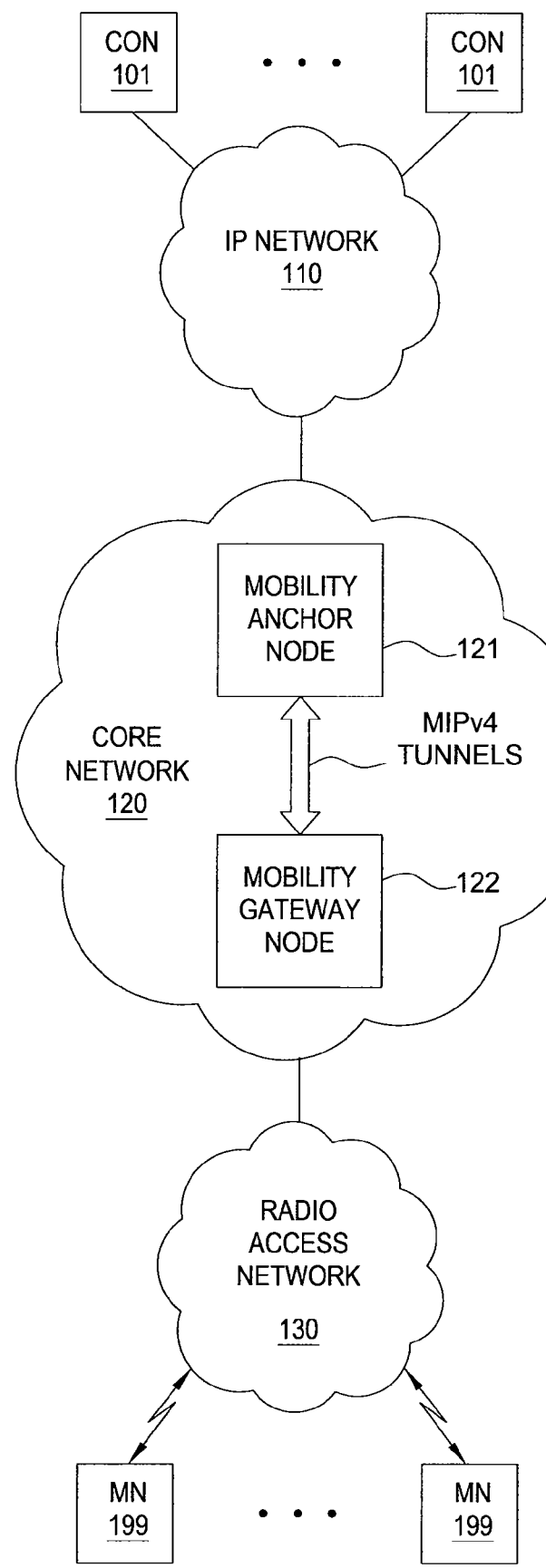
FIG. 1 depicts a high-level block diagram of a wireless communication network including a core network (CN) and a radio access network (RAN)

FIG. 1 depicts a high-level block diagram of a wireless communication network including a core network (CN) and a radio access network (RAN). As depicted in DFIG. 1, wireless communication network 100 includes an IP network 110, a core network (CN) 120, and a radio access network (RAN) 130. The IP network 110 facilitates communications for a plurality of correspondent nodes (CONs) 101. The IP network 110 communicates with CN 120. The RAN 130 facilitates communications for a plurality of mobile nodes (MNs) 199. The RAN 130 communicates with CN 120. The CN 120 facilitates communications between IP network 110 and RAN 130 and, thus, between CONs 101 and MNs 199.

The IP network 110 may include any IP network or combination of interconnected IP networks, such as one or more Intranets, the Internet, and the like, as well as various combinations thereof. Although represented as an IP network, IP network 110 may encompass various other types of packet networks.

The CN 120 is a core network. As depicted in FIG. 1, CN 120 includes a mobility anchor node 121 and a mobility gateway node 122. The mobility anchor node 121 operates as a mobility anchor. The mobility anchor node 121 operates as a gateway between CN 120 and IP network 110. The mobility gateway node 122 operates as a gateway between CN 120 and RAN 130. The CN 120 includes various other network elements adapted for providing various other functions, services, and the like (each of which is omitted for purposes of clarity).

The RAN 130 is a radio access network, providing an air interface for mobile nodes. The RAN 130 may include a control node and a radio access node, as well as various other nodes which may be deployed within different types of RANs (each of which is omitted for purposes of clarity).

The IP network 110, CN 120, and RAN 130 facilitate communications between CONs 101 and MNs 199.

The CONs 101 include nodes with which MNs 199 may communicate. The CONs 101 may be stationary and/or mobile. For example, CONs 101 may include phones (e.g., wired VoIP phones, wireless mobile phones, and the like), servers, and the like. For example, the CONs 101 may include Disney servers providing Disney content, CBS News servers providing CBS News content, or any other servers adapted for serving MNs 199. In other words, CONs 101 may include any nodes with which MNs 199 may communicate to exchange information.

The MNs 199 include wireless nodes which have wireless network connectivity via RAN 130. For example, MNs 199 may include nodes such as cell phones, personal digital assistants (PDAs), computers, and the like.

The examples of CONs 101 and MNs 199 provided herein are merely for illustrative purposes and, therefore, the proprietary information signaling functions depicted and described herein are not intended to be limited by such examples.

The wireless communication network 100 (and, therefore, CN 120 and RAN 130) may be implemented using any wireless communication network technologies. For example, the wireless communication network 100 may be implemented using one or more of a Universal Mobile Telecommunication System (UMTS)-based wireless network, a Code Division Multiple Access (CDMA)-based wireless network, a Worldwide Interoperability for Microwave Access (WiMAX)-based wireless network, and the like. The network elements deployed within CN 120 and RAN 130 vary depending on the type of wireless communication network employed.

In one embodiment, for example, where the wireless communication network 100 is a UMTS-based Long Term Evolution (LTE) network, mobility anchor node 121 may be implemented as a Packet Data Network (PDN)-Gateway (PDN-GW) and mobility gateway node 122 may be implemented as a Serving-Gateway (S-GW).

In one embodiment, for example, where the wireless communication network 100 is a CDMA2000 Evolution-Data Optimized (EV-DO) network, mobility anchor node 121 may be implemented as a Home Agent (HA) and mobility gateway node 122 may be implemented as a Packet Data Serving Node (PDSN).

In one embodiment, for example, where RAN 130 is a UMTS-based RAN, the control node is a Radio Network Controller (RNC) and the radio access node is a Node B. In one such embodiment, for example, where RAN 130 is an LTE-based RAN, the radio access node is an eNode-B.

In one embodiment, for example, where RAN 130 is a CDMA-based RAN, the control node is a Radio Network Controller (RNC) and the radio access node is a base transceiver station (BTS).

In one embodiment, for example, where RAN 130 is a WiMAX-based RAN, the control node is an Access Service Network-Gateway (ASN-GW) and the radio access node is a base station (BS).

Although primarily depicted and described with respect to specific types of wireless communications networks, the proprietary information signaling functions depicted and described herein may be utilized in various other types of wireless communications networks.

The CN 120 supports propagation of proprietary information within CN 120.

The CN 120 supports propagation of proprietary information within CN 120 from the mobility anchor node 121 to the mobility gateway node 122. The mobility gateway node 122 may then signal the proprietary information to RAN 130 for use by one or more nodes of the RAN 130 in performing one or more control functions within RAN 130.

The CN 120 supports propagation of proprietary information within CN 120 from the mobility gateway node 122 to the mobility anchor node 121. The CN 120 may then use the proprietary information in performing one or more control functions within CN 120.

The propagation of proprietary information within CN 120 for a given IP packet is performed by tunneling IP packets within CN 120 using Mobile IPv4 (MIPv4) tunneling. An IP packet that is tunneled using MIPv4 tunneling includes a payload, an inner IP packet header, and an outer IP packet header. The inner IP packet header propagates the proprietary information using one or more IPv4 Options fields which are added to the inner IP packet header at the source node endpoint of the MIPv4 tunnel and removed from the inner IP packet header at the destination node endpoint of the MIPv4 tunnel. The inner IP packet header and payload form a payload for an outer IP packet header. The outer IP packet header is used to route the IP packet between the endpoints of the MIPv4 tunnel, such that the inner IP packet header remains transparent to all of the intermediate nodes between the endpoints of the MIPv4 tunnel.

As described herein, proprietary information is propagated within CN 120 using one or more IPv4 Options fields. In general, an IP packet may include zero or more IPv4 Options fields, which makes the total length of the IPv4 Options field in an IP packet header of the IP packet variable. The IPv4 Options field(s) which may be included within the header of an IP packet is standardized in RFC 791, which is incorporated herein by reference in its entirety. The IPv4 Options field(s) is typically used to support functions such as source routing, trace route recording, router time stamping, and military security classification and, thus, cannot be used for other signaling purposes. In the proprietary information signaling scheme depicted and described herein, however, forward tunneling (i.e., from mobility anchor node 121 to mobility gateway node 122 in the direction toward the RAN 130) and reverse tunneling (i.e., from the mobility gateway node 122 to the mobility anchor node 121 in the direction from the RAN 130) both use an outer IP packet header which is pre-pended to each IP packet being tunneled, thereby rendering the inner IP packet header of each IP packet (which is essentially transported as part of the payload within the tunnel) transparent to intermediate nodes of the tunnel. As such, for forward tunneling the mobility anchor node 121 may add one or more IPv4 Options fields to the inner IP packet header in order to communicate proprietary information with the CN 120 for delivery to the RAN 130; and for reverse tunneling the mobility gateway node 122 may add one or more IPv4 Options fields to the inner IP packet header in order to communicate proprietary information, received from the RAN 130, to one or more nodes within the CN 120.

As described herein, wireless communication network 100 supports forward communication paths from CONs 101 toward MNs 199 and supports reverse communication paths from MNs 199 toward CONs 101. The forward communication paths utilize forward tunneling in the CN 120 (i.e., tunneling from mobility anchor node 121 to mobility gateway node 122) for propagating proprietary information from CN 120 toward RAN 120, which may be better understood with respect to FIG. 2. The reverse communication paths utilize reverse tunneling in the CN 120 (i.e., tunneling from mobility gateway node 122 to mobility anchor node 121) for propagating proprietary information from RAN 130 within CN 120, which may be better understood with respect to FIG. 3.

Figure 2:
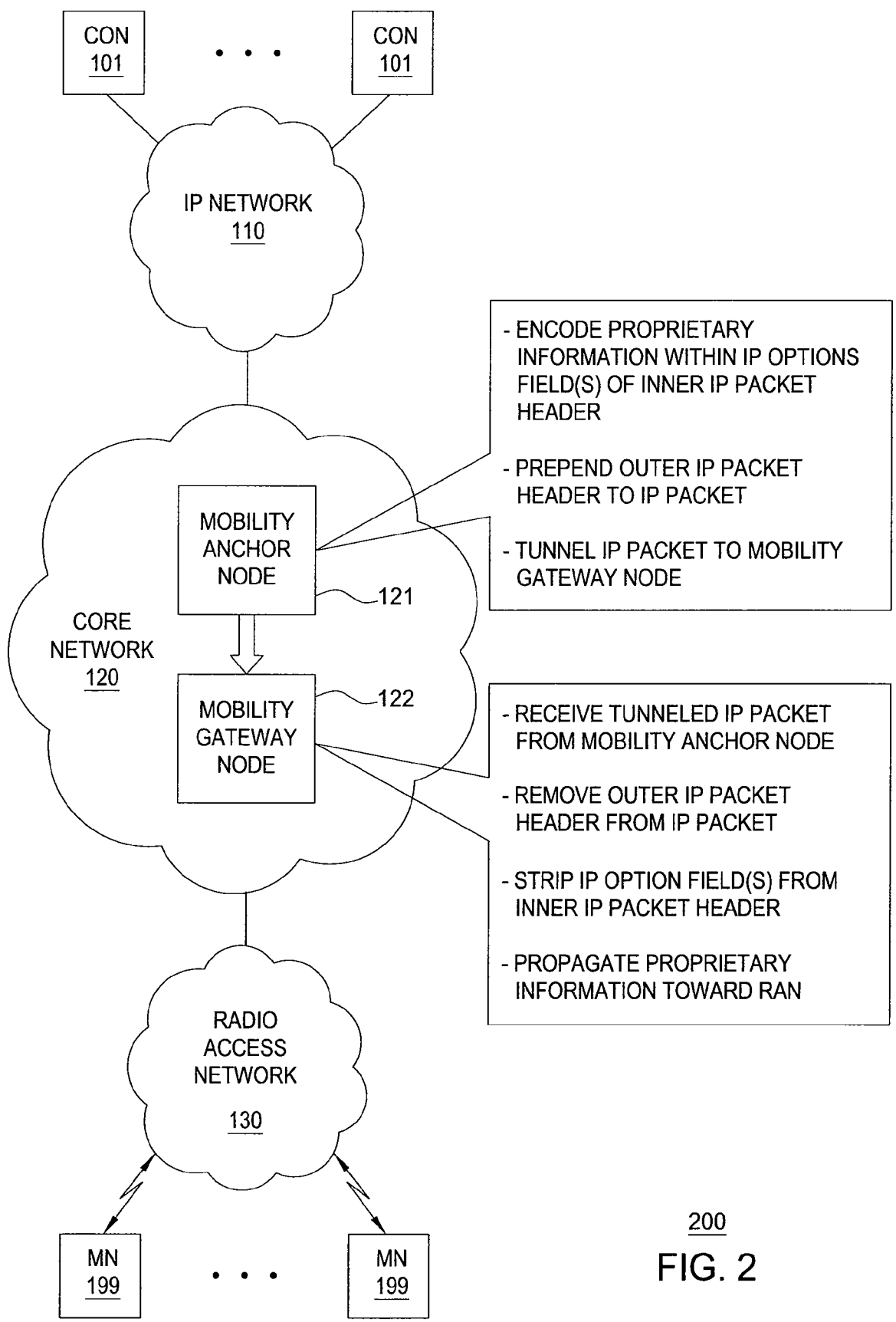
FIG. 2 depicts the communication network of FIG. 1 illustrating a method for propagating proprietary information using forward tunneling in a direction from the CN toward the RAN.

FIG. 2 depicts the communication network of FIG. 1 illustrating a method for propagating proprietary information using forward tunneling in a direction from the CN 120 toward the RAN 130.

The mobility anchor node 121 receives an IP packet (which may also be referred to as an original IP packet). The mobility anchor node 121 receives the IP packet from the IP network 110 (e.g., where the IP packet is part of a packet flow from one of the CONs 101 toward one or more of the MNs 199). The received IP packet includes a payload and a header (which is referred to herein as an inner header).

The mobility anchor node 121 encodes proprietary information in one or more IPv4 Options fields which are added to the inner header of the IP packet received at the mobility anchor node 121 to form a modified IP packet.

The proprietary information may include any information which may be used for performing control functions within RAN 130.

In one embodiment, for example, proprietary information associated with an IP packet of an IP flow may specify information such as the type of application of the IP flow (e.g., e-mail, voice over IP, streaming video, and the like), the specific application of the IP flow (e.g., YouTube, Skype, Slingbox, and the like), the content provider that is the source of the content being conveyed by the IP flow (e.g., Disney, MSNBC, CNN, and the like), and the like, as well as various combinations thereof.

In one embodiment, for example, proprietary information associated with an IP packet of an IP flow may specify one or more policies to be applied to the IP packet within the RAN 130. In one such embodiment, the policy(s) to be applied to the IP packet within RAN 130 may be determined using such higher-layer information (e.g., the type of application of the IP flow, specific application of the IP flow, content provider that is the source of the content being conveyed by the IP flow, and the like, as well as various combinations thereof).

The proprietary information may include any other information which may be used for performing control functions within RAN 130.

The proprietary information may be determined by the mobility anchor node 121 by performing deep packet inspection on the payload of the received IP packet. The proprietary information may be received at mobility anchor node 121 from one or more other nodes of CN 120 (not depicted). The proprietary information may be determined, received, or otherwise obtained in various other ways. The proprietary information may be encoded within the one or more IPv4 Options fields in any manner for encoding such information.

The mobility anchor node 121 prepends an outer header to the modified IP packet such that the inner header and payload of the modified IP packet together form a payload for the outer header. The outer header identifies mobility anchor node 121 as the source node of the IP packet and mobility gateway node 122 as the destination node of the IP packet. The IP packet including the original payload, the inner header, and the outer header is tunneled from the mobility anchor node 121 to the mobility gateway node 122 (and, thus, is referred to as a tunneled IP packet).

The mobility anchor node 121 propagates the tunneled IP packet to the mobility gateway node 122. The tunneled IP packet is tunneled from mobility anchor node 121 to mobility gateway node 122 using the information in the outer header of the tunneled IP packet. In this manner, the proprietary information is tunneled from mobility anchor node 121 to mobility gateway node 122 without the proprietary information being processed by any intermediate nodes along the path between mobility anchor node 121 and mobility gateway node 122.

The mobility gateway node 122 receives the tunneled IP packet from mobility anchor node 121. The mobility gateway node 122 removes the outer header from the tunneled IP packet. The mobility gateway node 122 strips any IPv4 Options fields from the inner header of the IP packet, thereby returning the modified IP packet to its original form (i.e., to the format of the IP packet originally received by mobility anchor node 121). The mobility gateway node 122 recovers the proprietary information from the stripped IPv4 Options field(s).

The mobility gateway node 122 propagates the original IP packet to the RAN 130 for delivery to its intended destination (e.g., one of the MNs 199) via RAN 130. The mobility gateway node 122 may propagate the original IP packet to RAN 130 in any manner for propagating IP packets from CN 120 to RAN 130.

The mobility gateway node 122 propagates the proprietary information toward RAN 130. The mobility gateway node 122 may propagate proprietary information toward RAN 130 in any manner for propagating such information from CN 120 to RAN 130. In one embodiment, for example, the proprietary information may be propagated to RAN 130 using one or more existing RAN protocols.

The RAN 130 receives the proprietary information. The RAN 130 uses the proprietary information to perform one or more control functions within the RAN 130. For example, the control function(s) which may be performed within the RAN 130 using proprietary information includes one or more of performing a network management operation, performing a quality-of-service control operation, performing a congestion control operation (e.g., applying flow control, applying overload control, and the like), and the like, as well as various combinations thereof.

As an example, upon receiving the proprietary information, RAN 130 may determine that IP packets of the IP flow are associated with a preferred application (e.g., CNN) and, thus, are to be given priority within RAN 130 over other packets of other IP flows not associated with preferred applications.

As another example, upon receiving the proprietary information, RAN 130 may determine that IP packets of the IP flow are associated with a type of application requiring a certain air-interface bandwidth) in order to maintain an acceptable level of quality-of-service (e.g., a streaming video application) and, thus, are to be given priority over other IP flows conveying content for other types of applications.

Figure 3:
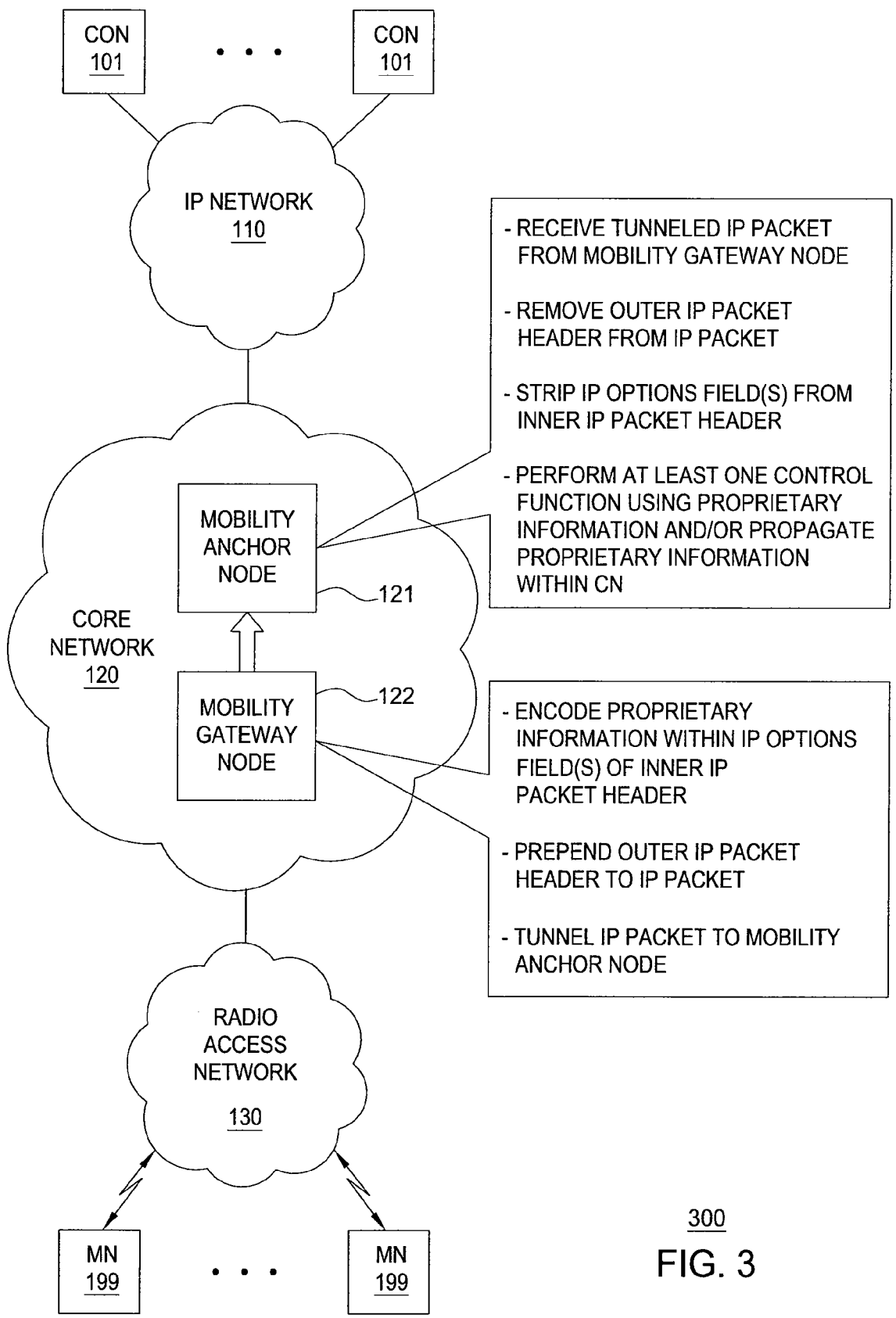
FIG. 3 depicts the communication network of FIG. 1 illustrating a method for propagating proprietary information using reverse tunneling in a direction from the RAN toward the CN.

FIG. 3 depicts the communication network of FIG. 1 illustrating a method for propagating proprietary information using reverse tunneling in a direction from the RAN 130 toward the CN 120.

The mobility gateway node 122 receives an IP packet (which may also be referred to as an original IP packet). The mobility gateway node 122 receives the IP packet from the RAN 130 (e.g., where the IP packet is part of a packet flow from one of the MNs 199 toward one of the CONs 101). The received IP packet includes a payload and a header (which is referred to herein as an inner header).

The mobility gateway node 122 encodes proprietary information in one or more IPv4 Options fields which are added to the inner header of the IP packet received at the mobility gateway node 122 to form a modified IP packet.

The proprietary information may include any information which may be used for performing control functions within CN 120. For example, the proprietary information may specify information such as RAN congestion status. This status may be used by the CN to control the flow of data from the CN 120 to the RAN 130. For example, the proprietary information may be used to specify flow admission control information to be used by the CN 120 to determine whether a new flow may be admitted to the network. For example, the proprietary information may be used to provide RAN capability information to the CN 120 to ensure compatibility between CN and RAN functions. The proprietary information may be used within CN 120 in various other ways.

The proprietary information may be determined by the mobility gateway node 122 by performing deep packet inspection on the payload of the received IP packet. The proprietary information may be received at mobility gateway node 122 from one or more other nodes of CN 120 and/or RAN 130 (not depicted). The proprietary information may be determined, received, or otherwise obtained in various other ways. The proprietary information may be encoded within the one or more IPv4 Options fields in any manner for encoding such information.

The mobility gateway node 122 prepends an outer header to the modified IP packet such that the inner header and payload of the modified IP packet together form a payload for the outer header. The outer header identifies mobility gateway node 122 as the source node of the IP packet and mobility anchor node 121 as the destination node of the IP packet. The IP packet including the original payload, the inner header, and the outer header is tunneled from the mobility gateway node 122 to the mobility anchor node 121 (and, thus, is referred to as a tunneled IP packet).

The mobility gateway node 122 propagates the tunneled IP packet to the mobility anchor node 121. The tunneled IP packet is tunneled from the mobility gateway node 122 to the mobility anchor node 121 using the information in the outer header of the tunneled IP packet. In this manner, the proprietary information is tunneled from mobility gateway node 122 to mobility anchor node 121 without the proprietary information being processed by any intermediate nodes along the path between mobility gateway node 122 and mobility anchor node 121.

The mobility anchor node 121 receives the tunneled IP packet from mobility gateway node 122. The mobility anchor node 121 removes the outer header from the tunneled IP packet. The mobility anchor node 121 strips any IPv4 Options fields from the inner header of the IP packet, thereby returning the modified IP packet to its original form (i.e., to the format of the IP packet originally received by mobility gateway node 122). The mobility anchor node 121 recovers the proprietary information from the stripped IPv4 Options field(s).

The mobility anchor node 121 propagates the original IP packet toward its intended destination (e.g., one of the CONs 101) via IP network 110. The mobility anchor node 121 may propagate the original IP packet toward its intended destination in any manner for propagating IP packets within a packet network.

The mobility anchor node 121 may utilize the proprietary information to perform one or more control functions and/or may propagate the proprietary information toward one or more other nodes inside and/or outside of CN 120 for use in performing one or more control functions. The mobility anchor node 121 may propagate the proprietary information within or outside of CN 120 in any manner adapted for propagating such information.

The CN 120 uses the proprietary information to perform one or more control functions within the CN 120. For example, the control function(s) which may be performed within the CN 120 using proprietary information includes one or more of performing a network management operation, performing a quality-of-service control operation, performing a congestion control operation (e.g., applying flow control, applying overload control, and like congestion control operations), determining compatibility between CN and RAN functions using RAN capability information signaled into the CN from the RAN, and the like, as well as various combinations thereof.

Although primarily depicted and described herein with respect to IP packets, the proprietary information signaling functions depicted and described herein may be utilized for propagating proprietary information between the CN and RAN in networks that convey information using other types of packets. In such embodiments, proprietary information may be conveyed in the packets in any manner supported by the type of packet within which proprietary information is to be conveyed.

Figure 4:
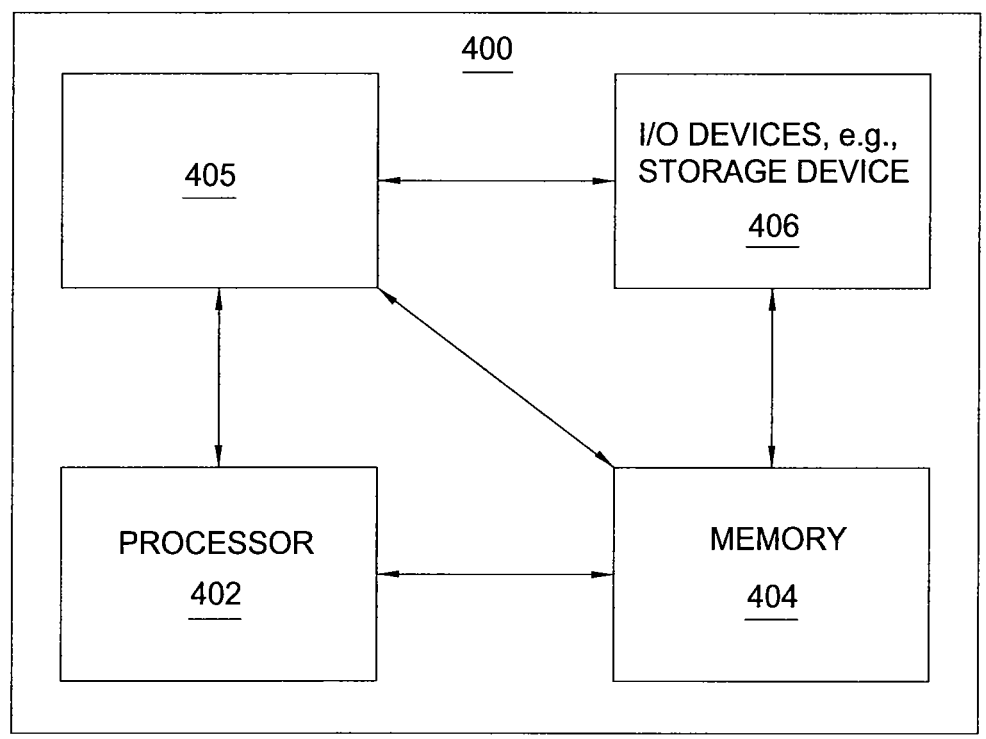
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, system 400 comprises a processor element 402 (e.g., a CPU), a memory 404, e.g., random access memory (RAM) and/or read only memory (ROM), a proprietary information signaling control module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, a proprietary information signaling control process 405 can be loaded into memory 404 and executed by processor 402 to implement the functions as discussed above. As such, proprietary information signaling control process 405 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for signaling information within a core network (CN) of a wireless communication network, comprising:

receiving, at a mobility anchor node of the CN, an Internet Protocol (IP) packet of an IP flow, wherein the IP packet comprises a header and a payload;

determining, at the mobility anchor node of the CN, information associated with the IP flow, wherein the information associated with the IP flow comprises information indicative of at least one of an application type associated with the IP flow, an application associated with the IP flow, and a content source associated with content of the IP flow;

encoding, at the mobility anchor node of the CN, the information associated with the IP flow in an Internet Protocol version 4 (IPv4) Options field of the header of the IP packet; and pre-pending, at the mobility anchor node of the CN, an outer header to the IP packet for Mobile IPv4 (MIPv4) tunneling of the IP packet from the mobility anchor node of the CN toward a mobility gateway node of the CN.

2. The method of claim 1, wherein the information associated with the IP flow is determined by the mobility anchor node using deep packet inspection.

3. The method of claim 1, wherein the information associated with the IP flow is received at the mobility anchor node of the CN from at least one other node of the CN.

4. The method of claim 1, wherein the information associated with the IP flow is adapted for use by a radio access network (RAN) in performing at least one control function within the RAN.

5. The method of claim 4, wherein performing the at least one control function comprises at least one of performing a network management operation, performing a quality-of-service control operation, and performing a congestion control operation.

6. The method of claim 1, wherein:

if the wireless communication network is a CDMA-based network, the mobility anchor node is a home agent (HA) and the mobility gateway node is a packet data serving node (PDSN) operating as a gateway from the CN to a radio access network (RAN); or if the wireless communication network is a LTE-based RAN, the mobility anchor node is a PDN gateway (P-GW) and the mobility gateway node is a serving gateway (S-GW) operating as a gateway from the CN to a radio access network (RAN).

7. A method for signaling information within a wireless communication network having a core network (CN) and a radio access network (RAN), comprising:

receiving, at a mobility gateway node of the CN, an Internet Protocol (IP) packet associated with an IP flow, wherein the IP packet comprises an outer header, an inner header, and a payload;

removing the outer header from the IP packet at the mobility gateway node of the CN;

stripping an Internet Protocol version 4 (IPv4) Options field from the inner header of the IP packet at the mobility gateway node of the CN, wherein the IPv4 Options field includes information associated with the IP flow, wherein the information associated with the IP flow comprises information indicative of at least one of an application type associated with the IP flow, an application associated with the IP flow, and a content source associated with content of the IP flow; and propagating the information associated with the IP flow from the mobility gateway node of the CN toward the RAN.

8. The method of claim 7, wherein the information associated with the IP flow is adapted for use by the RAN in performing at least one control function within the RAN.

9. The method of claim 8, wherein performing the at least one control function comprises at least one of performing a network management operation, performing a quality-of-service control operation, and performing a congestion control operation.

10. The method of claim 7, wherein the information associated with the IP flow is propagated from the mobility gateway node toward the RAN using at least one RAN signaling protocol.

11. The method of claim 7, wherein the information associated with the IP flow is propagated from the mobility gateway node toward a control node of the RAN, wherein:

if the RAN is a CDMA-based RAN, the control node is a Radio Network Controller (RNC); or if the RAN is a UMTS-based RAN, the control node is a Radio Network Controller (RNC); or if the RAN is a WiMAX-based RAN, the control node is an Access Service Network-Gateway (ASN-GW); or if the RAN is a LTE-based RAN, the control node is an eNode-B.

12. The method of claim 7, wherein the IP packet is received at the mobility gateway node of the CN from a mobility anchor node of the CN using Mobile IP version 4 (MIPv4) tunneling.

13. The method of claim 12, wherein:

if the wireless communication network is a CDMA-based network, the mobility anchor node is a home agent (HA) and the mobility gateway node is a packet data serving node (PDSN) operating as a gateway from the CN to the RAN; or if the wireless communication network is a LTE-based RAN, the mobility anchor node is a PDN gateway (P-GW) and the mobility gateway node is a serving gateway (S-GW) operating as a gateway from the CN to the RAN.

14. The method of claim 7, further comprising:

forwarding the modified IP packet, with the outer header and the IPv4 Options field removed, toward the RAN.

15. A method for signaling information within a wireless communication network having a core network (CN) and a radio access network (RAN), comprising:

receiving, at a mobility gateway node of the CN, an Internet Protocol (IP) packet comprising a header and a payload;

determining, at a mobility gateway node of the CN, information associated with the RAN, wherein the information associated with the RAN comprises information indicative of at least one of a status of the RAN and a capability of the RAN; encoding the information associated with the RAN in an Internet Protocol version 4 (IPv4) Options field included within the header of the IP packet; and pre-pending, at a mobility gateway node of the CN, an outer header to the IP packet for Mobile IPv4 (MIPv4) tunneling of the IP packet from the mobility gateway node of the CN toward a mobility anchor node of the CN.

16. The method of claim 15, wherein the information associated with the RAN is determined by the mobility gateway node using deep packet inspection.

17. The method of claim 15, wherein the information associated with the RAN is received at the mobility gateway node of the CN from a node of the RAN.

18. The method of claim 15, wherein the information associated with the RAN is adapted for use by the CN in performing at least one control function within the CN.

19. The method of claim 18, wherein performing the at least one control function comprises at least one of performing a network management operation, performing a quality-of-service control operation, and performing a congestion control operation.

20. The method of claim 15, wherein:
if the wireless communication network is a CDMA-based network, the mobility gateway node is a packet data serving node (PDSN) operating as a gateway to the CN from the RAN and the mobility anchor node is a home agent (HA); or
if the wireless communication network is a LTE-based RAN, the mobility gateway node is a serving gateway (S-GW) operating as a gateway to the CN from the RAN and the mobility anchor node is a PDN gateway (P-GW).

21. A method for signaling information within a wireless communication network having a core network (CN) and a radio access network (RAN), comprising:
receiving, at a mobility anchor node of the CN from a mobility gateway node of the CN, an Internet Protocol (IP) packet comprising an outer header, an inner header, and a payload;
removing the outer header from the IP packet at the mobility anchor node of the CN;
stripping an Internet Protocol version 4 (IPv4) Options field from the inner header of the IP packet at the mobility anchor node of the CN, wherein the IPv4 Options field includes information associated with the RAN and encoded within the IPv4 Options field at the mobility gateway node of the CN, wherein the information associated with the RAN comprises information indicative of at least one of a status of the RAN and a capability of the RAN; and
initiating at least one of:
performing a control function within the CN using the information associated with the RAN; and
propagating the information associated with the RAN toward at least one other node of the CN.

22. The method of claim 21, wherein performing the control function comprises at least one of performing a network management operation, performing a quality-of-service control operation, and performing a congestion control operation.

23. The method of claim 21, wherein the IP packet is received at the mobility anchor node of the CN from a mobility gateway node of the CN using Mobile IP version 4 (MIPv4) tunneling.

24. The method of claim 23, wherein:
if the wireless communication network is a CDMA-based network, the mobility anchor node is a home agent (HA) and the mobility gateway node is a packet data serving node (PDSN) operating as a gateway from the CN to the RAN; or
if the wireless communication network is a LTE-based RAN, the mobility anchor node is a PDN gateway (P-GW) and the mobility gateway node is a serving gateway (S-GW) operating as a gateway from the CN to the RAN.

25. The method of claim 1, wherein the information associated with the IP flow comprises proprietary information.

26. The method of claim 7, wherein the information associated with the IP flow comprises proprietary information.

27. The method of claim 15, wherein the information associated with the RAN comprises proprietary information.

28. The method of claim 21, wherein the information associated with the RAN comprises proprietary information.

29. An apparatus for signaling information within a core network (CN) of a wireless communication network, comprising:
a processor and a memory communicatively connected to the processor, the processor configured to:
receive, at a mobility anchor node of the CN, an Internet Protocol (IP) packet of an IP flow, wherein the IP packet comprises a header and a payload;
determine, at the mobility anchor node of the CN, information associated with the IP flow, wherein the information associated with the IP flow comprises information indicative of at least one of an application type associated with the IP flow, an application associated with the IP flow, and a content source associated with content of the IP flow;
encode, at the mobility anchor node of the CN, the information associated with the IP flow in an Internet Protocol version 4 (IPv4) Options field of the header of the IP packet; and
pre-pend, at the mobility anchor node of the CN, an outer header to the IP packet for Mobile IPv4 (MIPv4) tunneling of the IP packet from the mobility anchor node of the CN toward a mobility gateway node of the CN.

30. The apparatus of claim 29, wherein the processor is configured to determine the information associated with the IP flow at the mobility anchor node of the CN using deep packet inspection.

31. The apparatus of claim 29, wherein the processor is configured to receive the information associated with the IP flow at the mobility anchor node of the CN from at least one other node of the CN.

32. The apparatus of claim 29, wherein the information associated with the IP flow is adapted for use by a radio access network (RAN) in performing at least one control function within the RAN.

33. The apparatus of claim 32, wherein performing the at least one control function comprises at least one of performing a network management operation, performing a quality-of-service control operation, and performing a congestion control operation.

34. The apparatus of claim 29, wherein:
if the wireless communication network is a CDMA-based network, the mobility anchor node is a home agent (HA) and the mobility gateway node is a packet data serving node (PDSN) operating as a gateway from the CN to a radio access network (RAN); or
if the wireless communication network is a LTE-based RAN, the mobility anchor node is a PDN gateway (P-GW) and the mobility gateway node is a serving gateway (S-GW) operating as a gateway from the CN to a radio access network (RAN).

35. An apparatus for signaling information within a wireless communication network having a core network (CN) and a radio access network (RAN), comprising:
a processor and a memory communicatively connected to the processor, the processor configured to:
receive, at a mobility gateway node of the CN, an Internet Protocol (IP) packet associated with an IP flow, wherein the IP packet comprises an outer header, an inner header, and a payload;
remove the outer header from the IP packet at the mobility gateway node of the CN;
strip an Internet Protocol version 4 (IPv4) Options field from the inner header of the IP packet at the mobility gateway node of the CN, wherein the IPv4 Options field includes information associated with the IP flow, wherein the information associated with the IP flow comprises information indicative of at least one of an application type associated with the IP flow, an application associated with the IP flow, and a content source associated with content of the IP flow; and propagate the information associated with the IP flow from the mobility gateway node of the CN toward the RAN.

36. The apparatus of claim 35, wherein the information associated with the IP flow is adapted for use by the RAN in performing at least one control function within the RAN.

37. The apparatus of claim 36, wherein performing the at least one control function comprises at least one of performing a network management operation, performing a quality-of-service control operation, and performing a congestion control operation.

38. The apparatus of claim 35, wherein the processor is configured to propagate the infoimation associated with the IP flow from the mobility gateway node toward the RAN using at least one RAN signaling protocol.

39. The apparatus of claim 35, wherein the processor is configured to propagate the information associated with the IP flow from the mobility gateway node toward a control node of the RAN, wherein:
 if the RAN is a CDMA-based RAN, the control node is a Radio Network Controller (RNC); or
 if the RAN is a UMTS-based RAN, the control node is a Radio Network Controller (RNC); or
 if the RAN is a WiMAX-based RAN, the control node is an Access Service Network-Gateway (ASN-GW); or
 if the RAN is a LTE-based RAN, the control node is an eNode-B.

40. The apparatus of claim 35, wherein the IP packet is received at the mobility gateway node of the CN from a mobility anchor node of the CN using Mobile IP version 4 (MIPv4) tunneling.

41. The apparatus of claim 40, wherein:
 if the wireless communication network is a CDMA-based network, the mobility anchor node is a home agent (HA) and the mobility gateway node is a packet data serving node (PDSN) operating as a gateway from the CN to the RAN; or
 if the wireless communication network is a LTE-based RAN, the mobility anchor node is a PDN gateway (P-GW) and the mobility gateway node is a serving gateway (S-GW) operating as a gateway from the CN to the RAN.

42. The apparatus of claim 35, wherein the processor is configured to:
 forward the modified IP packet, with the outer header and the IPv4 Options field removed, toward the RAN.

43. An apparatus for signaling information within a wireless communication network having a core network (CN) and a radio access network (RAN), comprising:
 a processor and a memory communicatively connected to the processor, the processor configured to:
  receive, at a mobility gateway node of the CN, an Internet Protocol (IP) packet comprising a header and a payload;
  determine, at a mobility gateway node of the CN, information associated with the RAN, wherein the information associated with the RAN comprises information indicative of at least one of a status of the RAN and a capability of the RAN;
  encode the information associated with the RAN in an Internet Protocol version 4 (IPv4) Options field included within the header of the IP packet; and
  pre-pend, at a mobility gateway node of the CN, an outer header to the IP packet for Mobile IPv4 (MIPv4) tunneling of the IP packet from the mobility gateway node of the CN toward a mobility anchor node of the CN.

44. The apparatus of claim 43, wherein the processor is configured to determine the information associated with the RAN at the mobility gateway node using deep packet inspection.

45. The apparatus of claim 43, wherein the processor is configured to receive the information associated with the RAN at the mobility gateway node of the CN from a node of the RAN.

46. The apparatus of claim 43, wherein the information associated with the RAN is adapted for use by the CN in performing at least one control function within the CN.

47. The apparatus of claim 46, wherein performing the at least one control function comprises at least one of performing a network management operation, performing a quality-of-service control operation, and performing a congestion control operation.

48. The apparatus of claim 43, wherein:
 if the wireless communication network is a CDMA-based network, the mobility gateway node is a packet data serving node (PDSN) operating as a gateway to the CN from the RAN and the mobility anchor node is a home agent (HA); or
 if the wireless communication network is a LTE-based RAN, the mobility gateway node is a serving gateway (S-GW) operating as a gateway to the CN from the RAN and the mobility anchor node is a PDN gateway (P-GW).

49. An apparatus for signaling information within a wireless communication network having a core network (CN) and a radio access network (RAN), comprising:
 a processor and a memory communicatively connected to the processor, the processor configured to:
  receive, at a mobility anchor node of the CN from a mobility gateway node of the CN, an Internet Protocol (IP) packet comprising an outer header, an inner header, and a payload;
  remove the outer header from the IP packet at the mobility anchor node of the CN;
  strip an Internet Protocol version 4 (IPv4) Options field from the inner header of the IP packet at the mobility anchor node of the CN, wherein the IPv4 Options field includes information associated with the RAN and encoded within the IPv4 Options field at the mobility gateway node of the CN, wherein the information associated with the RAN comprises information indicative of at least one of a status of the RAN and a capability of the RAN; and
  initiate at least one of:
   performing a control function within the CN using the information associated with the RAN; and
   propagating the information associated with the RAN toward at least one other node of the CN.

50. The apparatus of claim 49, wherein performing the control function comprises at least one of performing a network management operation, performing a quality-of-service control operation, and performing a congestion control operation.

51. The apparatus of claim 49, wherein the processor is configured to receive the IP packet at the mobility anchor node of the CN from a mobility gateway node of the CN using Mobile IP version 4 (MIPv4) tunneling.

52. The apparatus of claim 51, wherein:
if the wireless communication network is a CDMA-based network, the mobility anchor node is a home agent (HA) and the mobility gateway node is a packet data serving node (PDSN) operating as a gateway from the CN to the RAN; or
if the wireless communication network is a LTE-based RAN, the mobility anchor node is a PDN gateway (P-GW) and the mobility gateway node is a serving gateway (S-GW) operating as a gateway from the CN to the RAN.

53. The apparatus of claim 29, wherein the information associated with the IP flow comprises proprietary information.

54. The apparatus of claim 35, wherein the information associated with the IP flow comprises proprietary information.

55. The apparatus of claim 43, wherein the information associated with the RAN comprises proprietary information.

56. The apparatus of claim 49, wherein the information associated with the RAN comprises proprietary information.

* * * * *